United States Patent
Todd et al.

(10) Patent No.: US 7,076,690 B1
(45) Date of Patent: Jul. 11, 2006

(54) METHOD AND APPARATUS FOR MANAGING ACCESS TO VOLUMES OF STORAGE

(75) Inventors: Stephen J. Todd, Shrewsbury, MA (US); Matthew J. D'Errico, Southborough, MA (US); Steven Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 408 days.

(21) Appl. No.: 10/122,556

(22) Filed: Apr. 15, 2002

(51) Int. Cl.
*G06F 11/00* (2006.01)
(52) U.S. Cl. .................................. 714/13; 714/5; 714/6
(58) Field of Classification Search ................. 714/15, 714/5, 6, 13
See application file for complete search history.

(56) References Cited

U.S. PATENT DOCUMENTS

| | | |
|---|---|---|
| 5,544,347 A | 8/1996 | Yanai et al. |
| 5,548,711 A | 8/1996 | Brant et al. |
| 5,680,640 A | 10/1997 | Ofek et al. |
| 5,742,792 A | 4/1998 | Yanai et al. |
| 5,822,531 A | 10/1998 | Gorczyca et al. |
| 5,870,545 A | 2/1999 | Davis et al. |
| 5,896,548 A | 4/1999 | Ofek |
| 6,058,054 A * | 5/2000 | Islam et al. .................. 365/200 |
| 6,065,077 A | 5/2000 | Fu |
| 6,078,990 A | 6/2000 | Frazier |
| 6,108,748 A | 8/2000 | Ofek et al. |
| 6,145,066 A | 11/2000 | Atkin |
| 6,161,218 A | 12/2000 | Taylor |

(Continued)

FOREIGN PATENT DOCUMENTS

WO  WO 2001/98889  12/2001

(Continued)

OTHER PUBLICATIONS

Blunden M., et al., Storage Networking Virtualization What's it all about, Dec. 2000 IBM Redbooks.

(Continued)

*Primary Examiner*—Robert Beausoliel
*Assistant Examiner*—Yolanda L. Wilson
(74) *Attorney, Agent, or Firm*—Wolf, Greenfield & Sacks, P.C.

(57) ABSTRACT

One embodiment is directed to a method in a computer system including a host computer and at least one storage system including first and second storage volumes, the host computer including at least one application program executing thereon. The method comprises acts of intercepting and redirecting an access request from the at least one application program to the first storage volume to the second storage volume. Other embodiments are directed to a computer readable medium with instructions for performing the method, a host computer with at least one controller to intercept and redirect the access request. Other aspects are directed to methods in a computer system including a host computer, a first storage system including a first storage volume, and a second storage system including a second storage volume, wherein the second storage volume is a hardware mirror of the first storage volume. One method comprises an act of servicing a read request to the second storage volume while maintaining the second storage volume as an active hardware mirror of the first storage volume. Another method comprises an act of, in response to a failure preventing access from the host computer to the first storage volume, servicing access requests directed to the first storage volume from the second storage volume without reconfiguring the host computer.

54 Claims, 5 Drawing Sheets

U.S. PATENT DOCUMENTS

| | | | |
|---|---|---|---|
| 6,173,377 B1 | | 1/2001 | Yanai et al. |
| 6,216,202 B1 | | 4/2001 | D'Errico |
| 6,233,607 B1 | | 5/2001 | Taylor et al. |
| 6,240,486 B1 | | 5/2001 | Ofek et al. |
| 6,266,784 B1 | * | 7/2001 | Hsiao et al. ............... 714/6 |
| 6,356,997 B1 | | 3/2002 | Krishnan et al. |
| 6,367,075 B1 | | 4/2002 | Kruger et al. |
| 6,370,626 B1 | | 4/2002 | Gagne et al. |
| 6,434,637 B1 | | 8/2002 | D'Errico |
| 6,523,036 B1 | | 2/2003 | Hickman et al. |
| 6,542,909 B1 | | 4/2003 | Tamer et al. |
| 6,564,336 B1 | * | 5/2003 | Majkowski ............... 714/4 |
| 6,598,134 B1 | | 7/2003 | Ofek et al. |
| 6,631,477 B1 | * | 10/2003 | LeCrone et al. ........... 714/5 |
| 6,640,278 B1 | | 10/2003 | Nolan et al. |
| 6,665,812 B1 | * | 12/2003 | Blumenau et al. ......... 714/5 |
| 6,691,245 B1 | * | 2/2004 | DeKoning ................. 714/6 |
| 6,760,828 B1 | | 7/2004 | Black |
| 6,832,289 B1 | | 12/2004 | Johnson |
| 6,874,046 B1 | * | 3/2005 | LeCrone et al. ........... 710/74 |
| 2002/0055941 A1 | | 5/2002 | Patterson |
| 2002/0056031 A1 | | 5/2002 | Skiba et al. |
| 2002/0133737 A1 | * | 9/2002 | Novick ..................... 714/5 |
| 2002/0133746 A1 | * | 9/2002 | Chen et al. ............... 714/13 |
| 2003/0009707 A1 | * | 1/2003 | Pedone et al. ............ 714/5 |
| 2003/0014523 A1 | | 1/2003 | Teloh et al. |
| 2003/0115434 A1 | | 6/2003 | Mahalingam et al. |
| 2003/0188218 A1 | | 10/2003 | Lubbers et al. |
| 2003/0217119 A1 | | 11/2003 | Raman et al. |
| 2003/0229764 A1 | | 12/2003 | Ohno et al. |
| 2004/0024975 A1 | | 2/2004 | Morishita et al. |
| 2004/0034628 A1 | | 2/2004 | Numao et al. |
| 2004/0139237 A1 | | 7/2004 | Rangan et al. |
| 2004/0215845 A1 | | 10/2004 | Davani et al. |

FOREIGN PATENT DOCUMENTS

| | | |
|---|---|---|
| WO | WO 2002/03203 | 1/2002 |

OTHER PUBLICATIONS

Khattar R., "Introduction to Storage Area Network, SAN", Aug. 1999, IBM.

The American College Dictionary, Copyright 2002, Houghton Mifflin Company Fourth Edition, p. 1038.

Pabst, Thomas, "Fast and inexpensive—Promise's Fast-Trak66 IDE RAID-Controller." Mar. 29, 2000. Tom's Hardware http://.tomshardware.com/storage/20000329/fastrak66-02.html>.

Patterson, David A. et al. "A Case for Redundant Arrays of Inexpensive Disks (RAID)", ACM 0-89791-268-3/88/0006/0109, 1998, pp. 109-116.

"Promise Milestone." 2005 http://www.promise.com/company/about/prms_milestone_eng.asp.

"Redundant array of independent disks." Wikipedia: The Free Encyclopedia. Nov. 10, 2005 <http://en.wikipedia.org/wiki/Redundant_array_of inexpensive disks>.

* cited by examiner

METHOD AND APPARATUS FOR MANAGING ACCESS TO VOLUMES OF STORAGE

FIELD OF THE INVENTION

The present invention is directed to computer systems employing multiple storage volumes, and more particularly, to methods and apparatus for managing access to storage volumes in such computer systems.

DESCRIPTION OF THE RELATED ART

Many computer systems include one or more host computers, and one or more storage systems that store data used by the host computers. An example of such a system is shown in FIG. 1, and includes a host computer 1 and a storage system 3. The storage system typically includes a plurality of storage devices on which data is stored. In the exemplary system shown in FIG. 1, the storage system includes a plurality of disk drives 5a–5b, a plurality of disk controllers 7a–7b that respectively control access to the disk drives 5a and 5b, and a cache 11. The storage system 3 further includes a plurality of storage bus directors 9 that control communication with the host computer 1 over communication buses 17. The storage system 3 also includes an internal bus 13 over which the storage bus directors 9, disk controllers 7a–7b and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links (either direct links or networked links), with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each including a SCSI driver. Alternatively, communication between the host computer 1 and the storage system 3 can be performed over a Fibre Channel fabric that implements the communication bus 17.

The storage system 3 presents logical volumes of storage to the host computer 1. These logical volumes of storage can each correspond to one of the physical storage devices 5a–b included within the storage system 3. However, when the storage system 3 is an intelligent storage system, it may include a layer of mapping between the volumes presented to the host computer 1 and the actual physical storage devices 5a–b. Thus, there need not be a one-to-one correspondence between the volumes presented to the host computer 1 and the physical storage devices, as a single volume can be spread across multiple physical storage devices, or alternatively, a number of physical storage devices can be combined to store the data for a single volume.

Many conventional computer systems, such as the exemplary computer system depicted in FIG. 1, mirror the data stored on a source (i.e., primary) volume or physical storage device to a target (i.e., secondary) volume or physical storage device. The primary and secondary volumes or physical storage devices may be disposed on the same system 3, or on different storage systems 3 which may be disposed either at the same approximate location or at geographically remote locations. Mirroring facilities may be characterized as being primarily enabled by hardware or software. As used herein, "hardware mirroring" refers to a mirroring arrangement implemented primarily via hardware, such that a software process performs a write operation only to the source, and the hardware automatically updates the target. This is in contrast to a software mirror, wherein the software process is responsible for writing data to both the source and the target. One illustrative example of a hardware data mirroring implementation is the remote data mirroring facility (RDF) discussed below in connection with FIG. 2.

In the system shown in FIG. 2, a host CPU 21 is coupled to a source storage system 26 that includes a source storage device 23 and source storage controller 25. The source storage device 23 may be a large disk drive providing main storage for the host CPU 21, or the storage system 26 may be arranged like the storage system 3 of FIG. 1, so that the storage device 23 may be a plurality of smaller disk drives. An example of a storage system including a plurality of disk drives is the SYMMETRIX line of disk arrays available from EMC Corporation, Hopkinton, Mass. The data stored on source storage device 23 may be crucial to the operation of host CPU 21. Therefore, a contingency is desirable in the event that a problem is experienced with source storage device 26, to ensure that data stored thereon is not lost, and to minimize the risk of CPU 21 being inoperable due to problems with the storage device.

FIG. 2 illustrates a system wherein data is mirrored from the source storage system 26 to a target storage system 28. Target storage system 28 includes a target storage controller 27 and an associated target storage device 29. As data is written to source storage device 23, it can also be mirrored to target storage device 29. If source storage device 23 is destroyed or experiences an error that renders stored data unrecoverable, the data can be retrieved from the mirroring target storage device 29. As shown in FIG. 2, the target system 28 can also serve as the main storage system for another host CPU 31. Alternatively, the storage system can be dedicated solely to mirroring the data stored in the source storage system without being coupled to another CPU. An example of a remote data facility as shown in FIG. 2 is described in commonly assigned U.S. Pat. No. 5,544,347 (Yanai).

Although the target storage system 28 can serve as the main storage system for the host CPU 31, the volumes presented to the host CPU 31 as storage resources enabling the host CPU 31 to write data to the target storage system 28 are different than the volumes that are made available to the source storage system 26 to provide the mirroring capability. In this manner, it is ensured that the volumes that store the mirrored data on the target storage system are not overwritten with different data from the host CPU 31.

An example of a system configuration that can be executed on a computer system such as that shown in FIG. 2 is a shared database configuration, such as the Oracle parallel server configuration shown in FIG. 3. In this configuration, instances of the Oracle database software are running on both the host computers 21 and 31, which can be considered to be servers. In this respect, a first instance of the Oracle database software 35a is executing on host computer 21, and a second instance 35b is executing on host computer 31. In the parallel server configuration, Oracle enables the instances of the database software 35a and 35b to share a storage volume, such as the storage volume 39 stored on the storage device 26. Some type of networking configuration (e.g., switch 37) enables the servers 21 and 31 to both access the volume 39 provided on the storage system 26. The two instances 35a and 35b of the Oracle database software communicate (e.g., via IP messaging as indicated by the dotted line at 38) to ensure that write requests are issued by only one host at a time to the shared volume 39.

Although not necessary to the parallel server configuration discussed above, the shared volume 39 may be mirrored, using a remote data facility as discussed above, to a volume 41 on a different storage system, such as the storage system 28 shown in FIG. 3.

SUMMARY OF THE INVENTION

One illustrative embodiment of the invention is directed to a method in a computer system including a host computer and at least one storage system including a first storage volume and a second storage volume, the host computer including at least one application program executing thereon. The method comprises acts of: (A) intercepting an access request from the at least one application program to the first storage volume; and (B) redirecting the access request to the second storage volume, so that the access request can be serviced by the second storage volume.

Another illustrative embodiment is directed to a computer readable medium encoded with instructions for execution on a computer system including a host computer and at least one storage system including a first storage volume and a second storage volume, the host computer including at least one application program executing thereon. The instructions, when executed, perform a method comprising acts of: (A) intercepting an access request from the at least one application program to the first storage volume; and (B) redirecting the access request to the second storage volume, so that the access request can be serviced by the second storage volume.

A further illustrative embodiment is directed to a host computer for use in a computer system including the host computer and at least one storage system including a first storage volume and a second storage volume. The host computer comprises at least one processor to execute at least one application program; and at least one controller that intercepts an access request from the at least one application program to the first storage volume and redirects the access request to the second storage volume, so that the access request can be serviced by the second storage volume.

Another illustrative embodiment is directed to a method in a computer system including a host computer, a first storage system including a first storage volume, and a second storage system including a second storage volume, the host computer including at least one application program executing thereon, the first and second storage systems being coupled together, the second storage volume being an active hardware mirror of the first storage volume. The method comprises an act of servicing a read request, from the at least one application program, to the second storage volume while maintaining the second storage volume as an active hardware mirror of the first storage volume.

A further illustrative embodiment is directed to a method in a computer system including a host computer, a first storage system including a first storage volume, and a second storage system including a second storage volume, the host computer including at least one application program executing thereon, the first and second storage systems being coupled together, the second storage volume being an active hardware mirror of the first storage volume. The method comprises an act of, in response to a failure preventing access from the host computer to the first storage volume, servicing access requests directed to the first storage volume from the second storage volume without reconfiguring the host computer.

DETAILED DESCRIPTION

Figure 1:
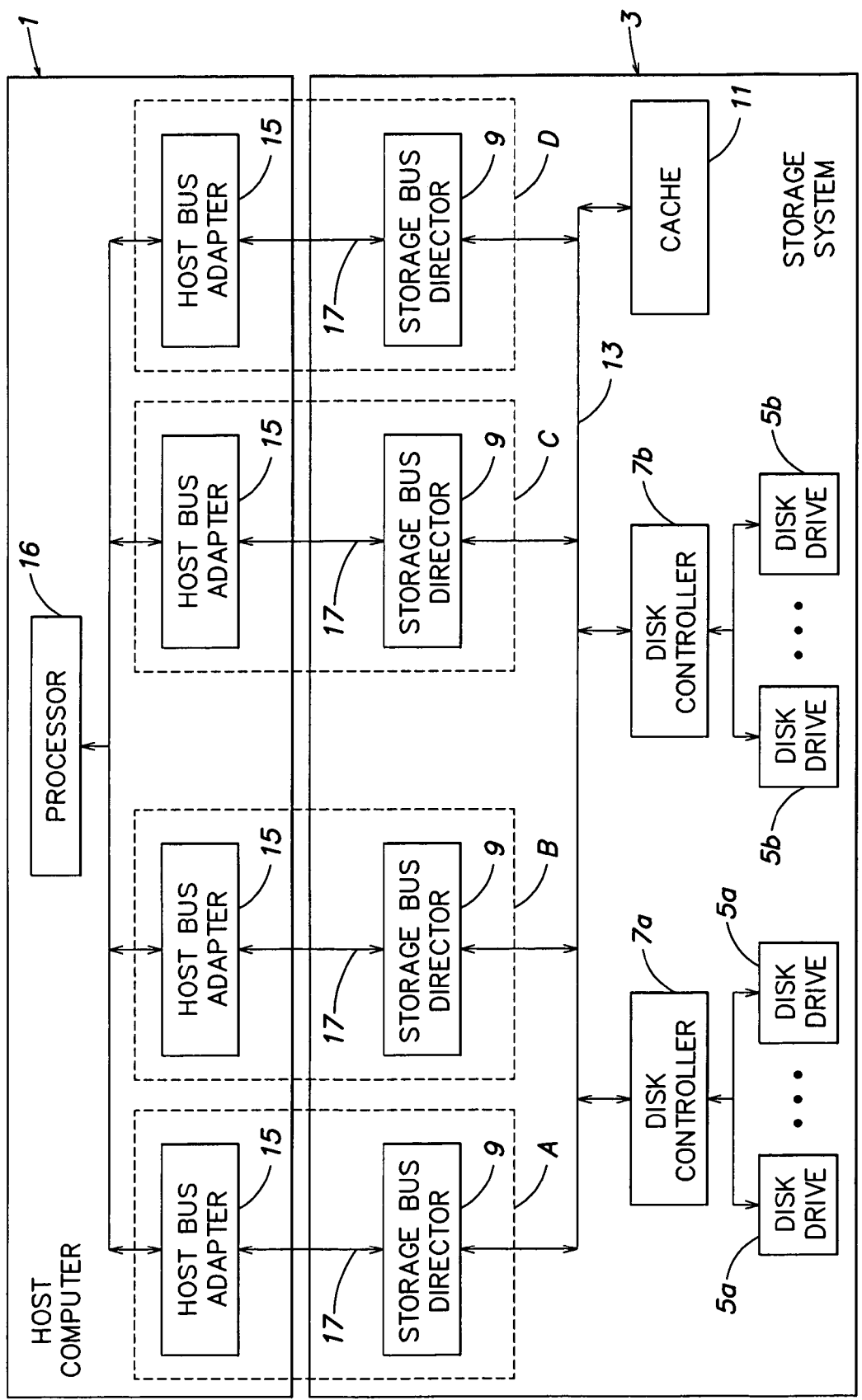
FIG. 1 is a block diagram of an exemplary computing system on which aspects of the present invention may be implemented.

In some database implementations employing a parallel server configuration, users may utilize one host (e.g., server 21 in FIG. 3) as a main server to perform the majority of processing, and utilize the other host (e.g., server 31) as a secondary server to perform tasks such as report generation, which do not perform writes but are heavily read-intensive. When such read-intensive tasks are performed by the secondary server (e.g., server 31), contention may result for access to the shared volume 39. In view of the fact that a copy of the shared volume 39 is provided in the mirrored volume 41, it has been appreciated by applicants that performance improvements could be obtained by having the secondary server 31 perform read-intensive tasks (e.g., report generation) from the target volume 41. However, the Oracle database software does not enable a storage volume to be presented to it in a read-only fashion, and only accepts the presentation of volumes that are available for both read and write access. As discussed above, since the target volume 41 is presented to the storage system 26 to allow write access to perform the remote mirroring, the volume 41 cannot be presented to the instance 35*b* of the Oracle database software in a manner that allows the instance 35*b* of the Oracle database software to write to the volume 41, or there would be a risk that the mirrored data could be overwritten. Therefore, in a parallel server configuration such as that shown in FIG. 3 that employs remote mirroring, the mirrored volume 41 cannot be made available to the Oracle database software 35*b* in a manner that provides the Oracle database 35*b* with read access to the volume 41, because doing so would require the granting of write access, which is prohibited.

In accordance with one embodiment of the present invention, a method and apparatus are provided to allow the instance 35*b* of the Oracle database software on the secondary server to read the mirrored volume 41, despite the fact that the instance 35*b* does not have access privileges to read the volume.

The above-described configuration is merely one example of an application in which the aspects of the present invention described below can be employed. In this respect, the aspects of the present invention are not limited to use with an Oracle parallel server configuration (e.g., the present invention might be implemented on a single host), and can be used with other types of shared databases, or with any of numerous other types of application programs. In this respect, the embodiment of the present invention described below that enables an application to read a storage volume despite the application program lacking access privileges to read the volume can be employed with any type of application program.

The aspect of the present invention that enables an application program to read a volume, despite lacking access privileges to read that volume, is not limited to any particular implementation technique. However, in accordance with one illustrative embodiment of the present invention, access to a mirrored volume 41 is provided by having the application program (e.g., the instance 35b of the Oracle database software) issue an access request to the primary volume (e.g., volume 39) for which it enjoys read access privileges. Using techniques discussed below, that access request is intercepted and redirected to volume 41 in a manner that is transparent to the application (e.g., the instance 35b of the Oracle database software). Thus, one embodiment of the present invention is directed to intercepting a request intended for a volume on one storage system and redirecting it to different volume on another storage system. Although useful in connection with configurations wherein the requesting application does not have access privileges to the volume to which the request is redirected, this aspect of the present invention is not so limited.

Figure 3:
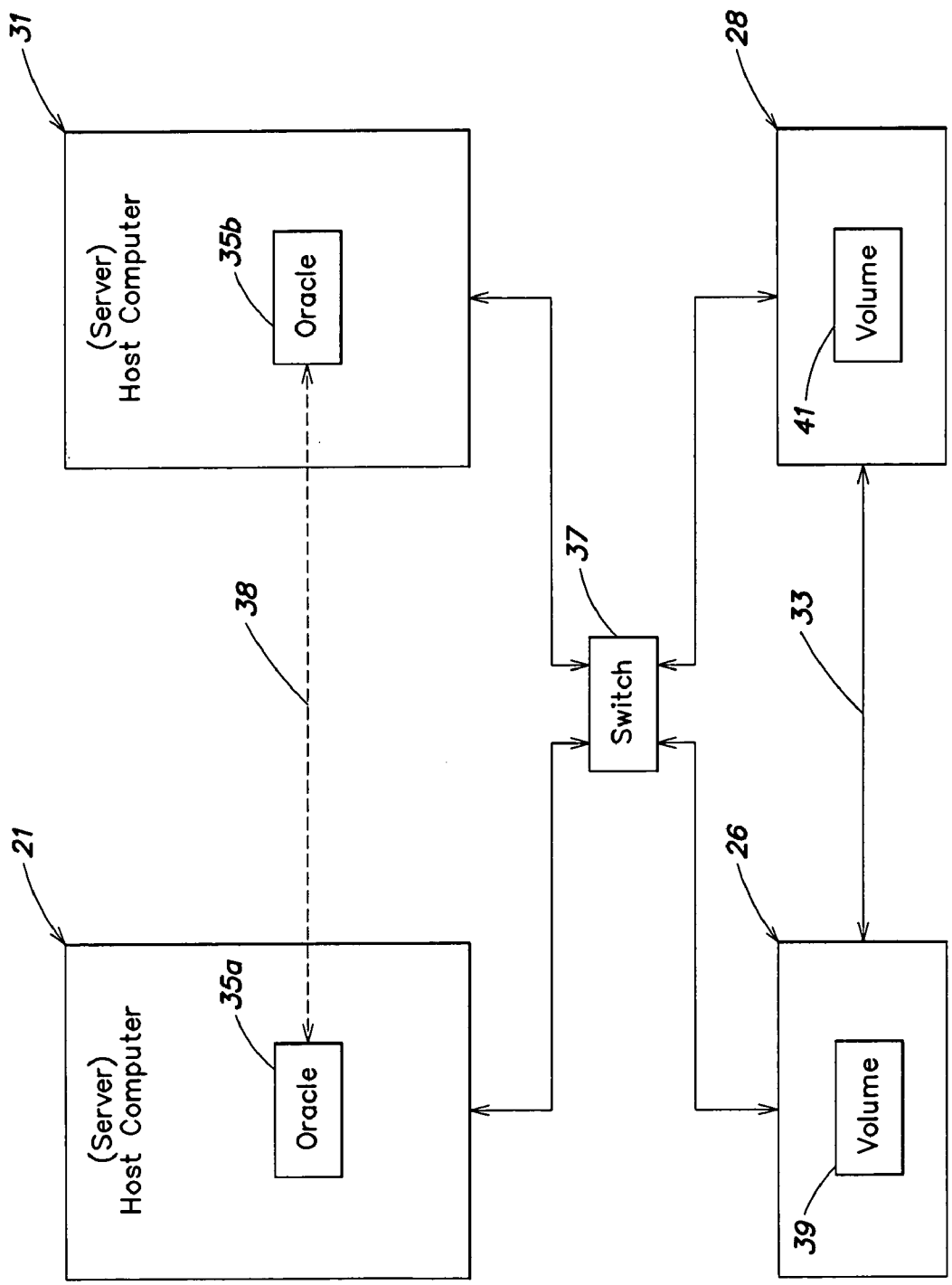
FIG. 3 is a schematic representation of a shared database configuration on which aspects of the present invention may be implemented.

As should also be appreciated from the foregoing, yet another embodiment of the present invention is directed to intercepting a request directed to one volume (e.g., volume 39) and redirecting the request to a mirror of that volume (e.g., volume 41). Although the mirror 41 is provided on a different storage system in the illustrative configuration shown in FIG. 3, this aspect of the present invention is not so limited, and can be used in other configurations to redirect a request from a first volume to a mirror of that volume stored on the same storage system. In addition, although the mirroring relationship in the illustrative configuration shown in FIG. 3 is a hardware mirror, the aspect of the present invention directed to intercepting a request directed to one volume and redirecting it to a mirror of that volume is not limited to redirecting the request to a hardware mirror.

In accordance with one embodiment of the present invention, reads directed to the target volume 41 can be executed while the remote data facility mirroring link (over communication path 33) remains active. Although conventional remote mirror data facilities enable the target volume to be read, many conventional configurations require that the system be reconfigured—the remote mirroring relationship must be terminated so that it is no longer active, and then the target volume is reconfigured to make it accessible (e.g., by granting both read and write access privileges) to a host computer (e.g., host computer 31), most typically for disaster recovery. As discussed below, in accordance with one illustrative embodiment of the present invention, a target volume can be read while maintaining the remote mirror link in an active state, and without reconfiguring the target volume. One way in which this aspect of the present invention can be employed is to not redirect all access requests to a particular volume (e.g., volume 39) from server 31, but rather, to only redirect read requests to volume 41, while allowing write requests to continue to pass to the volume 39. In this manner, writes are always made to the shared volume 39, and the hardware mirror of the computer system ensures that the volume 41 is maintained up to date, but the load on the storage system 26 is reduced by redirecting read requests to the volume 41 on the storage system 28. It should be appreciated that the aspect of the present invention wherein a target volume can be read while maintaining the remote mirror link in an active state (and without reconfiguring the target volume) is useful for numerous configurations, and is not limited to use in connection with a target volume that mirrors a shared volume in a shared database system.

In accordance with one illustrative embodiment of the present invention, the aspects of the present invention that relate to intercepting and redirecting an access request from one volume to another is performed by a filter driver in the input/output (I/O) stack in the kernel layer on the host. As will be appreciated by those of ordinary skill in the art, by the time an access request has reached the filter driver, it will typically have passed security and privilege access checking, such that it will be established that the request is authorized for the volume to which it is directed. In accordance with one embodiment of the present invention, a read request is then directed to a mirror of the volume to which the request is directed, such that there are no breach of security issues because the request has already been approved to access the requested data, but from a different volume.

In the embodiment of the present invention described below, the intercepting and redirecting functions performed in a filter driver in the I/O stack correspond to features of the Power Path utility offered by EMC Corporation, such that one embodiment of the present invention is directed to an implementation using Power Path. However, it should be appreciated that the present invention is not limited in this respect, and can be implemented in any I/O stack or similarly enabled mechanism employed in any system configuration, or may be implemented in various other ways. It should be appreciated that the implementation of the aspects of the present invention described herein can be modified to be compatible with the particular implementation of the I/O stack in which it is implemented.

Figure 4:
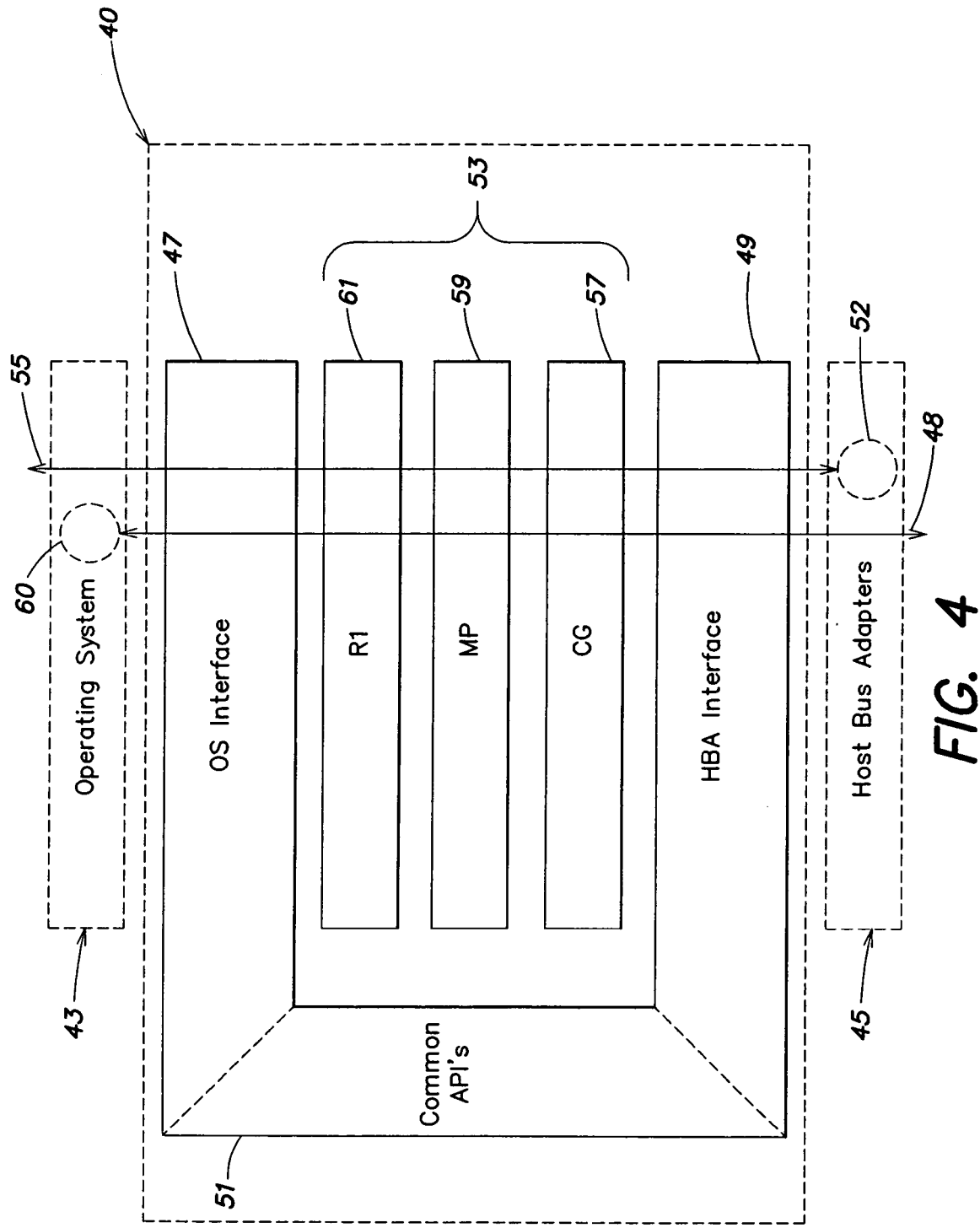
FIG. 4 is a schematic representation of an exemplary I/O stack in which aspects of the present invention relating to redirecting I/O requests are implemented.

One illustrative implementation of aspects of the present invention in a filter driver in an I/O stack is shown in FIG. 4. As illustrated therein, the filter driver 40 can conceptually be considered to be placed between the operating system 43 and the collection of host bus adapters 45. (see e.g., the host bus adapters 15 in FIG. 1). As discussed above, the storage system (e.g., storage system 3 in FIG. 1) presents volumes of storage to the host computer for assignment to various resources therein, such as to provide storage space for a file system, an LVM or database. Volumes are presented via signals arriving at the collection of host bus adapters 45 on the host. These signals are processed by (i.e., can be thought of as passing up through) filter driver 40, which creates a volume representation 60—e.g., a data structure representing the volume and attributed functionality. In accordance with one illustrative embodiment of the present invention, functionality may be attributed to the volume representation(s) using methods described below. This processing of a volume from host bus adapters 45, through filter driver 40, to operating system 43 is typically performed at initialization, or boot, of the host or storage system.

In the embodiment shown in FIG. 4 the filter driver 40 may be thought of conceptually as taking a "C clamp" form, with a top horizontal arm 47 of the C clamp including platform-dependent code comprising an interface to the operating system 43 (which may be any operating system, including such commercially prevalent operating systems as Sun Solaris, Linux, and Windows NT), a bottom horizontal arm 49 of the C clamp including platform-dependent code comprising an interface to the host bus adapters 45 (which may be any host bus adapter), and a vertical connector 51 between the arms comprising a series of common Application Programming Interfaces (APIs). Between the top and bottom arms 47, 49 of the clamp sit a stack of extensions 53, which can be written in platform-independent software code (e.g., C, Java or any other language). This C clamp configuration is advantageous, in that the extensions that implement various functionality can be written in a platform-independent manner, as the top 47 and bottom 45 arms of the C clamp translate all of the platform-dependent communications into a generic manner, thereby facilitating attribution of functions by the extensions on a number of computing platforms.

As discussed above, at initialization, volumes presented by the storage system can be thought of as being received at the bottom arm 49 of the C clamp, and flowing upward through the stack of extensions 53 to operating system 43. Depending on the various functional aspects associated with a volume (e.g., whether the volume is a source or target mirrored volume), extensions that relate to the relevant functions will attach data structures to the volume so that when access requests are directed in the future to that volume, the filter driver 40 can implement the associated functions, examples of which are described below. Alternatively, if an extension relates to the performance of functional aspects that are not associated with a particular volume being passed up through the filter driver, the volume will be essentially ignored by that extension—i.e., the extension will receive it from the extension or interface below and will not create or add anything to it, and simply pass it up to the extension above it.

As will be described below, in accordance with one embodiment of the present invention, the intercepting and redirecting functions of some embodiments of the present invention can be implemented using an extension provided in the extension stack 53. This is entirely independent from inclusion of any other particular functions performed by or with other extensions, as the present invention can be implemented in a filter driver including extensions which perform numerous functions. For the sake of facilitating and understanding the manner in which extensions work, three exemplary extensions are described below. However, it should be appreciated that the present invention is not limited to use in a filter driver that includes extensions performing these functions, and can be used in accordance with extensions performing other functions.

Extensions 57, 59 and 61 can indicate that they should process an access request directed to a particular volume in any of numerous ways. In accordance with one illustrative embodiment of the present invention, each time a new volume is presented by the storage system to host bus adapters 45, and passed up through the extension stack 53, a volume representation 60 is created for that volume by the filter driver. The volume representation can be implemented in any of numerous ways, and the present invention is not limited to any particular implementation. In one example, the volume representation may comprise a data structure including an identifier that identifies the volume (e.g., using an identifier that is consistent with the manner in which the operating system 43 references the volume). As the volume representation 60 passes up through the extension stack, extensions may indicate that they should act on an access request directed to that volume by attaching a data structure (indicating the extension that has attached it) to the volume representation. Conversely, extensions may indicate that they should not act on an access request directed to a particular volume by not attaching a data structure to the volume representation, and simply passing the volume representation up to the next extension in the stack. The attachment of a data structure can be performed in any of numerous ways, such as by modifying the volume representation 60 to include a pointer to the attached data structure. As discussed below, the attached data structure may include instructions on processing an access request directed to the particular volume when the request is passed down through extension stack 53.

In accordance with the embodiment of the invention described above that employs a volume representation, when an access request 52 is passed from the operating system to the filter driver 40, the filter driver can be thought of as conceptually directing the request to the volume representation, and passing the access request together with the volume representation 60 down through the extension stack 53. As the volume representation 60 and request 52 are passed through each extension, the information in the volume representation (e.g., data structures which have been attached by extensions) may be examined by each extension to determine whether it should process the request. If not, the extension may simply dispatch the request and volume representation to the next extension down the stack. If, however, the extension determines that it should process the request based on an indication in the volume representation (e.g., a data structure attached by that extension) the extension may act on the request, and may also examine the attached data structure for instructions on processing the request, including instructions which the extension may provide to succeeding extensions as the request is passed down the stack.

Figure 2:
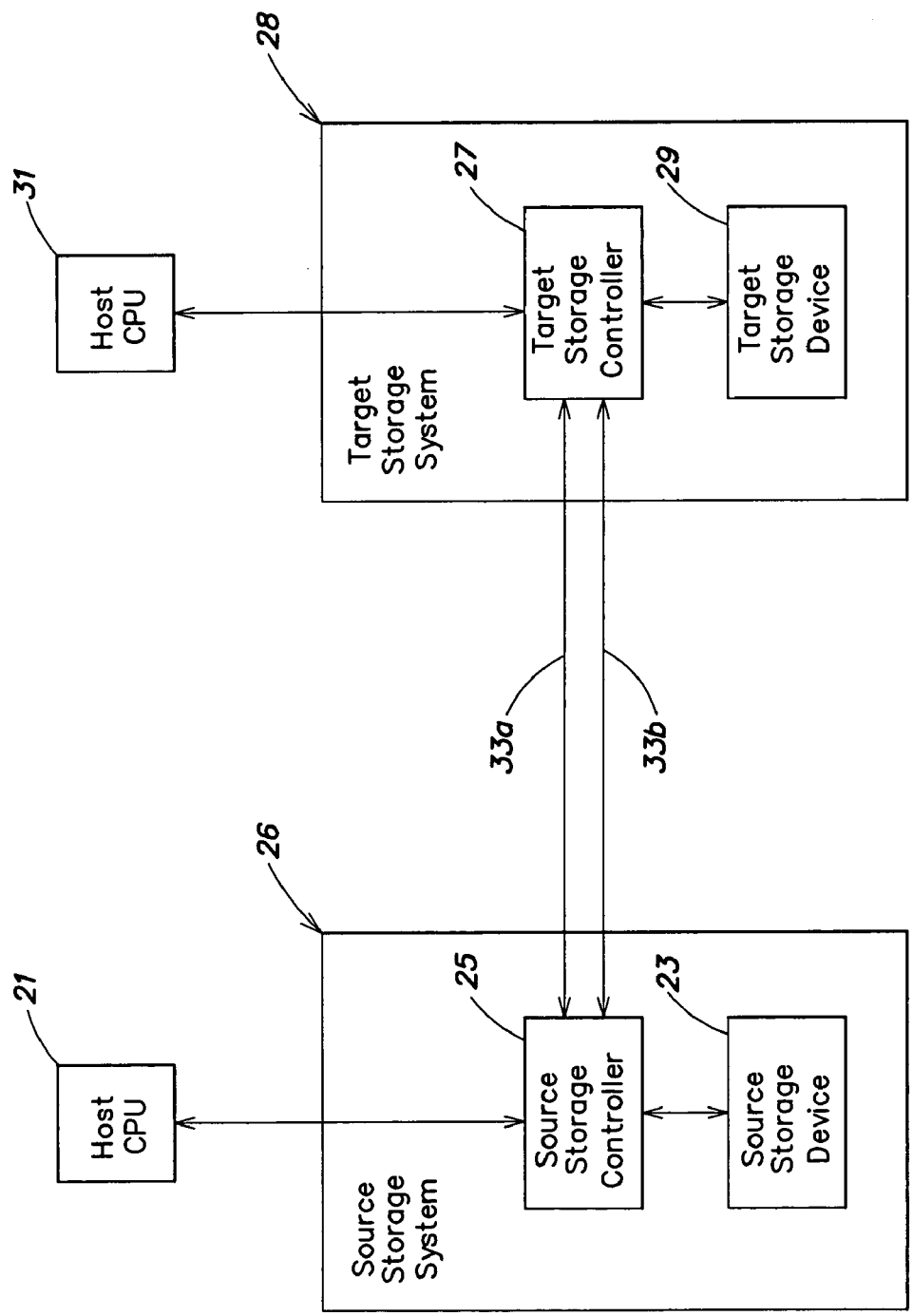
FIG. 2 is a block diagram of a data mirroring facility on which aspects of the present invention may be implemented.

In the embodiment shown in FIG. 4, the stack of extensions 53 includes three extensions: the Consistency Group (CG) 57, Multi-Pathing (MP) 59 and Redirect (RI) 61 extensions. The Consistency Group extension 57 specifically deals with volumes that are mirrored in a remote data facility configuration such as that shown in FIG. 2. As shown in FIG. 2, such configurations can include multiple links 33a–b over which mirroring information is transmitted between the source and target storage systems. The notion of a consistency group is that there are certain volumes of storage that are largely interrelated, such that it is desirable that they maintain consistency with respect to the timeframe at which they represent an accurate mirror of source volumes. Thus, one purpose of a consistency group may be to ensure that if one of the links 33a–b experiences a problem so that a particular volume in the source storage system can no longer be mirrored to the target storage system after the link goes down, the mirroring relationship for all other volumes in the same consistency group should be terminated at that same time, even if the mirroring relationship could continue because those volumes employ a different link that has not failed. Thus, in this embodiment, since the function performed by the consistency group extension 57 relates only to volumes that are part of a remote data facility mirroring relationship, the consistency group extension 57 will indicate (e.g., by attaching a data structure) that it should process requests directed only to volume representations that are part of a remote data mirroring relationship. For requests relating to all other volumes, the consistency group extension 57 will take no other action.

Multi-path extension 59 relates to various functions that can be performed in a multi-path system such as that shown in FIG. 1. For example, in such a system, multiple instances of a volume can be presented to the filter driver 40, with an instance corresponding to a presentation of the volume over each of the multiple paths. Various functions can be performed with these multiple instances, including for example, the selection of a particular path based on a selection criteria that maximizes system performance (e.g., load balancing). Thus, if there are multiple paths between the host computer and the storage system, the multi-path extension 59 may attach a data structure to every volume that passes through the filter driver 40, and if there is only a single path between the host and the storage system, the multi-path extension 59 may simply pass all the volumes up the extension stack 53 without attaching a data structure to them.

The redirect extension 61 is one wherein various functions in accordance with the embodiments of the present invention described herein may be implemented. In accordance with one illustrative embodiment, a request directed to a particular volume (e.g., volume 39 in FIG. 3) is redirected to a mirror of that volume (e.g., volume 41 in FIG. 3). Again, the volume to which the request is redirected can be a mirrored volume on a different storage system, or can be a mirror (e.g., a hardware mirror) on the same storage system. Thus, in accordance with one illustrative embodiment of the present invention, the redirect extension only indicates that it should act on (e.g., by attaching a data structure) requests directed to volume representations from which data is mirrored (i.e., source mirrored volumes) in the considered configuration. However, the present invention is not limited in this respect, as the redirect extension could alternatively indicate (e.g., by attaching a data structure) that it should act on requests directed to every volume representation.

When an application executing on the host computer attempts to access data stored on the storage system, it most typically issues a request to some mapping entity in the host computer (e.g., a file system, an LVM, or a database), or alternatively may in some circumstances issue a direct request to a "raw" volume. Mapping layers in a host computer typically translate the request into one or more access requests directed to particular volumes. Thus, whether coming directly from an application program for a direct access to a "raw" volume, or from a mapping layer, access requests ultimately are typically passed, via operating system 43, to the I/O stack and the filter driver 40 included therein.

Upon arrival at the filter driver 40, an access request directed to a volume can be thought of as being sent, with the volume representation (with attached data structures), down through extension stack 53. If an extension has indicated (e.g., by attaching a data structure) that it should act on a request to the volume being accessed, it will then perform whatever functions are defined within the extension, and additionally, may process additional instructions stored in the attached data structure. Alternatively, if an extension determines that it has not attached a data structure to the considered volume representation, it will simply dispatch the request and volume representation down the extension stack 53 without taking any action.

The manner in which the redirect extension attaches itself to a volume can be implemented in any of numerous ways, as this aspect of the present invention is not limited to any particular implementation technique. As discussed above, in one embodiment of the present invention, this attachment is performed through the creation of a data structure associated with a volume. The data structure can take any of numerous forms, and is not limited to any particular structure. One illustrative structure is shown in FIG. 5.

Figure 5:
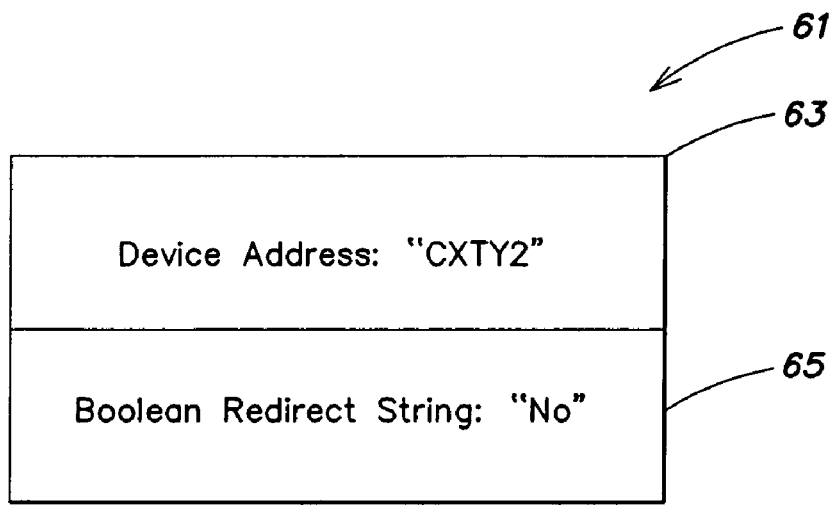
FIG. 5 is a schematic representation of an exemplary unmodified data structure used in the I/O stack of FIG. 4.

In the illustrative embodiment of FIG. 5, the data structure 61 attached by the redirect extension 61 to a volume representation includes at least two data elements: an identifier 63 of the volume and an indication 65 of whether access requests to the identified volume should be redirected. It should be appreciated that the identifier 63 and the indication 65 can be implemented in any of numerous ways, as embodiments of the present invention that employ this technique are not limited to any particular implementation. In accordance with one embodiment of the present invention shown in FIG. 5, the identifier 63 may comprise any form of identifier, including an identifier that is in the same form as that employed by the operating system 55 (FIG. 4) to reference a volume, and the indication 65 may comprise a string containing a "yes" or "no" value.

In the state shown in FIG. 5, the data structure 61 attached to the volume representation indicates that access requests directed to that volume are not to be redirected. Thus, when the request and volume representation are processed by the redirect extension 61 (FIG. 4), the extension simply passes the volume and its associated device representation down the extension stack 53.

In accordance with one illustrative embodiment of the present invention, a facility is provided that enables the data structure attached to a volume representation to be modified to request redirection. This facility can be implemented in any of numerous ways, as the present invention is not limited to any particular implementation technique. In accordance with one illustrative embodiment of the present invention, the redirect extension 61 can be made responsive to a modified attached data structure to implement redirection of the request. The attached data structure may be modified via the submission of a command line utility, or in other ways.

Figure 6:
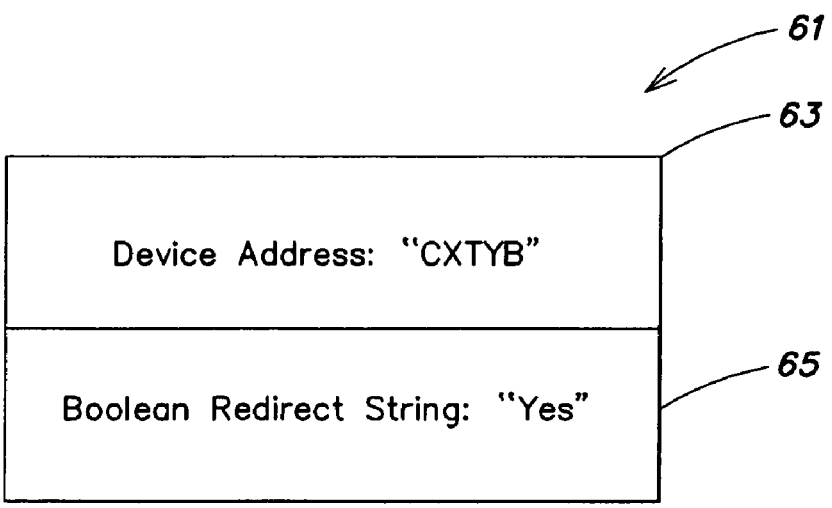
FIG. 6 is a schematic representation of the data structure of FIG. 5 modified to implement redirection of I/O requests in accordance with one embodiment of the present invention.

For example, FIG. 6 illustrates the attached data structure 61 of FIG. 5, wherein the device identifier 63 and the indication 65 have been modified. As shown in FIG. 6, indication 65 now indicates that redirection is requested for the volume representation to which the data structure 61 is attached. In addition, the device identifier 63 has been modified to identify a different volume to which the request is to be redirected (e.g., volume 41 in the example discussed above in connection with FIG. 3). Thus, after the attached data structure 61 has been updated, each subsequent request to the considered volume will result in redirect extension 61 identifying, from the attached data structure 61, that the request should be redirected to the volume identified in the identification field 63.

It should be appreciated that using the implementation of the filter driver 40 described above in connection with FIGS. 4–6, a user of the instance 35*b* of the Oracle database on host computer 31 can selectively read from the volume 41, despite the fact that the instance 35*b* of the Oracle database does not have access privileges to the volume 41. In this respect, the filter driver 40 (FIG. 4) can be implemented on the host computer 31. During normal operation, the attached data structure for the volume 39 can be placed in the condition shown in FIG. 5, indicating that no redirection is intended. In that manner, all accesses from the instance 35*b* of the Oracle database will be directed to the volume 39. However, when it is desired to perform reads from the volume 41 (e.g., to do report generation), a user can make use of a command line interface to modify the data structure 61 that is attached to the volume representation corresponding to volume 39, to the form shown in FIG. 6, to indicate that requests directed to that volume should be redirected to the volume 41. In this manner, the instance 35*b* of the Oracle database can access the volume 41 in real time, without deactivating the remote mirroring relationship of the volume 41 to the volume 39. In this respect, it is preferable that the remote mirroring relationship between the volumes 39 and 41 be synchronous, so that it is ensured that when the instance 35b of the Oracle database software performs a read of volume 41, it is reading the most up-to-date copy of data stored on volume 39.

The manner in which the redirect extension 61 redirects an access request directed to a volume when this is indicated in the data structure 61 attached to the volume representation can be performed in any of numerous ways. In accordance with one illustrative embodiment of the present invention, the redirection is performed when the redirect extension 61 dispatches the request to the succeeding extension, as the request is dispatched with the volume representation for the new volume to which the request has been redirected. The request and that new volume representation are processed by succeeding extensions in sequence, as defined by extension stack 53. Thus, each of the extensions below the redirect extension 61 processes the access request with the new volume representation that corresponds to the volume to which the request is redirected, and the bottom arm 49 of the filter driver 40 examines this new volume representation in formatting the request to the host bus adapters 45, such that the access request is forwarded to the volume identified in the identification field 63 ("CXTYB" as depicted in identifier 63 in FIG. 6).

The volume representation for the new volume to which the request is redirected can be retrieved in any of numerous ways, as the present invention is not limited to any particular implementation. In accordance with one illustrative embodiment of the invention, when the volume representations for the volumes are passed up through the extension stack 53 at boot time, a table is created that includes an entry for each volume with a pointer in the entry pointing to the data structure that defines the device representation for that volume. To redirect an access request to a new volume, the redirect extension 61 can access the table and substitute the pointer for the device representation of the new volume for the pointer that was included in the original request.

As should be appreciated from the foregoing, in the embodiment of the present invention wherein the interception and redirection of an access request is performed within the I/O stack of a host computer, this capability need only be provided in a host computer in which it is desirable to perform redirection. For example, in the parallel server configuration of FIG. 3, if the only redirection desired is to enable the instance 35b of the Oracle database to read the volume 41, the above-described aspects of the present invention can be implemented in the I/O stack of the host computer 31, but need not be provided in the I/O stack of the host computer 21. Of course, the present invention is not limited in this respect, as the aspects of the present invention described above can alternatively be provided in the I/O stack of two or more host computers in a computer system configuration.

It should be appreciated that the interception and redirection aspects of the present invention are distinct from other types of conventional volume management techniques, for example those employed by LVMs. In this respect, some LVMs will manage access to a plurality of logical volumes that store multiple copies of data. However, this is performed in a significantly different way. In particular, a typical LVM that utilizes multiple copies of data and multiple logical volumes will pool those logical volumes together and identify them with a common identifier (e.g., a pseudoname) which it presents to application programs. Thus, application programs will attempt to access the logical volume identified by the pseudoname, and the LVM will then process that access request by forwarding the request to one of the logical volumes that are included in the pool identified by the pseudoname. This configuration does not involve the interception of an access request directed to one logical volume and a redirection to another, as the access request to the pseudoname is not a request to an actual logical volume, and cannot be considered to be redirected to a different logical volume, but rather is simply forwarded to one of a pool of logical volumes that are identified by the pseudoname.

It should be appreciated that the above-described implementation of the interception and redirection aspects of the present invention is provided merely for illustrative purposes, as numerous other implementations are possible. As mentioned above, the above-described implementation is one that is compatible with EMC's Power Path product, such that the explanation of the device representation and attached data structures has been provided to demonstrate that compatibility. However, it should be appreciated that the aspects of the present invention can be implemented in any of numerous other ways, including using data structures of entirely different types. In addition, aspects of the present invention can also alternatively be implemented in hardware.

As discussed above, although the particular configuration of FIG. 3 in which the embodiments of the present invention have been employed relates to a remote mirroring relationship, it should be appreciated that aspects of the present invention are not so limited, and can alternatively be employed to redirect an access request directed to one volume to a local mirror of that volume which may reside on the same storage system.

Furthermore, although the embodiment described above relates to the redirection of read requests, the aspects of the present invention described herein are not so limited, as other configurations may make it desirable to redirect access requests of other types (e.g., write requests).

In accordance with one embodiment of the present invention, the interception and redirection of an access request is done in a manner that is transparent to the application program that issued the request, such that the application program that issued the request is unaware that is has been serviced by a different volume. In fact, in some embodiments, the application program that issues the access request may not even be aware that the volume to which the access request has been redirected even exists. Although advantageous, it should be appreciated that the transparent nature of the interception and redirection is not a requirement for all embodiments of the present invention, as in alternate embodiments some facility can optionally be provided to make the requesting application aware that a request has been intercepted and redirected.

The illustrative system configuration of FIG. 3 employs two host computers 21 and 31. However, it should be appreciated that the embodiments of the present invention discussed above can be employed in other configurations, including ones with more host computers or a single host computer. Similarly, although some of the embodiments discussed above have been described in connection with a computer system including a pair of storage systems, it should be appreciated that aspects of the present invention can be implemented in connection with computer systems including a single storage system, for example where an access request can be redirected from one volume to another on the same storage system.

Furthermore, although in the illustrative example provided above the aspects of the present invention are employed in a parallel server database configuration to allow for read access to a secondary volume, it should be appreciated that the aspects of the present invention can be employed in any of numerous ways, including to effectively implement load balancing techniques between multiple copies of the data in a volume to achieve performance improvements.

In the description above, redirection has been described as being based upon all access requests, or on a particular type of access request, such as a read request. However, it should be appreciated that the present invention is not limited in this respect, and that redirection can be based upon any type of policy or rule that is desirable. For example, it may be desirable to redirect only read requests over a particular size. That specific example may be useful because large reads may be particularly important to redirect to avoid overloading the main storage system. However, it should be appreciated that this is provided only as one example of a policy or rule that can be considered in determining whether to redirect an access request, and that numerous other rules or policies can be employed.

In another embodiment, the redirection aspects of the present invention can be employed to implement fail-over in a remote data facility. For example, referring to the computer system configuration of FIG. 3, in the event of a failure preventing access from the host computer 21 to the volume 39 in the source storage system 26, the I/O stack in the host computer 21 can be instructed to automatically redirect both read and write requests to the mirrored volume 41. In this manner, fail-over can be automatically achieved without reconfiguration of the computer system. This aspect of the present invention is not limited to remote data facility systems having the configuration of FIG. 3, and can be employed with any remote data facility (e.g., including those with only a single host computer).

The above-described embodiments of the present invention can be implemented in any of numerous ways. For example, the above-discussed functionality for intercepting and redirecting an access request can be implemented using hardware, software or a combination thereof. When implemented in software, the software code can be executed on any suitable processor. It should further be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above. In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. In a computer system including a host computer and at least one storage system including a first storage volume and a second storage volume, the host computer including at least one application program executing thereon, a method comprising acts of:
   (A) intercepting an access request from the at least one application program to the first storage volume; and
   (B) redirecting said access request to the second storage volume, so that the access request can be serviced by the second storage volume;
wherein the acts (A) and (B) are performed within the host computer.

2. The method of claim 1, wherein the host computer includes an input/output (I/O) stack, and wherein the acts (A) and (B) are performed in the I/O stack.

3. The method of claim 1, wherein the second storage volume is a mirror of the first storage volume, and wherein the act (B) includes an act of redirecting said access request to the mirror of the first storage volume.

4. The method of claim 1, wherein the acts (A) and (B) are performed in a manner that is transparent to the at least one application program.

5. The method of claim 1, wherein the at least one application program includes a database management system application program.

6. The method of claim 1, wherein the access request is a read request.

7. The method of claim 1, wherein the computer system includes multiple host computers and multiple instances of the at least one application program executing simultaneously on the multiple host computers and sharing access to the first volume; and
   wherein the act (A) includes an act of intercepting an access request from a first instance of the at least one application program to the first storage volume.

8. The method of claim 7, further including an act of, in parallel with the acts (A) and (B), passing requests from a second instance of the at least one application program to the first volume.

9. The method of claim 8, wherein the at least one storage system includes a first storage system that stores the first storage volume and a second storage system that stores the second storage volume, wherein the second storage volume is a hardware mirror of the first storage volume, and wherein the act (B) includes an act of redirecting said access request to the hardware mirror of the first storage volume.

10. The method of claim 7, wherein the at least one storage system includes a first storage system that stores the first storage volume and a second storage system that stores the second storage volume, wherein the second storage volume is a hardware mirror of the first storage volume, and wherein the act (B) includes an act of redirecting said access request to the hardware mirror of the first storage volume.

11. The method of claim 1, wherein the computer system includes multiple host computers and multiple instances of the at least one application program executing simultaneously on the multiple host computers and sharing access to the first volume, the at least one application program including a database management system application program; and wherein the act (A) includes an act of intercepting an access request from a first instance of the database management system application program.

12. The method of claim 11, wherein the at least one storage system includes a first storage system that stores the first storage volume and a second storage system that stores the second storage volume, wherein the second storage volume is a hardware mirror of the first storage volume, and wherein the act (B) includes an act of redirecting said access request to the hardware mirror of the first storage volume.

13. The method of claim 1, wherein the at least one application program lacks access privileges to read from the second storage volume.

14. The method of claim 1, wherein the host computer includes an input/output (I/O) stack including a driver, and wherein the acts (A) and (B) are performed by the driver in response to a command received from a user to intercept and redirect access requests to the first storage volume.

15. The method of claim 1, wherein the second storage volume is a hardware mirror of the first storage volume, and wherein the act (B) includes an act of redirecting said access request to the hardware mirror of the first storage volume.

16. The method of claim 1, wherein the first and second storage volumes are included on a same storage system.

17. The method of claim 1, wherein the at least one storage system includes a first storage system that stores the first storage volume and a second storage system that stores the second storage volume.

18. The method of claim 17, wherein the second storage volume is a hardware mirror of the first storage volume, and wherein the act (B) includes an act of redirecting said access request to the hardware mirror of the first storage volume.

19. A computer readable medium encoded with instructions for execution on a computer system including a host computer and at least one storage system including a first storage volume and a second storage volume, the host computer including at least one application program executing thereon, the instructions, when executed, perform a method comprising acts of:

(A) intercepting an access request from the at least one application program to the first storage volume; and (B) redirecting said access request to the second storage volume, so that the access request can be serviced by the second storage volume;

wherein the instructions are coded to be executed on the host computer so that acts (A) and (B) are performed by the host computer.

20. The computer readable medium of claim 19, wherein the host computer includes an input/output (I/O) stack including a driver, and wherein the instructions are coded to be executed by the driver so that the acts (A) and (B) are performed by the driver.

21. The computer readable medium of claim 19, wherein the second storage volume is a mirror of the first storage volume, and wherein the act (B) includes an act of redirecting said access request to the mirror of the first storage volume.

22. The computer readable medium of claim 19, wherein the acts (A) and (B) are performed in a manner that is transparent to the at least one application program.

23. The computer readable medium of claim 19, wherein the at least one application program includes a database management system application program.

24. The computer readable medium of claim 19, wherein the access request is a read request.

25. The computer readable medium of claim 19, wherein the computer system includes multiple host computers and multiple instances of the at least one application program executing simultaneously on the multiple host computers and sharing access to the first volume; and wherein the act (A) includes an act of intercepting an access request from a first instance of the at least one application program to the first storage volume.

26. The computer readable medium of claim 19, wherein the computer system includes multiple host computers and multiple instances of the at least one application program executing simultaneously on the multiple host computers and sharing access to the first volume, the at least one application program including a database management system application program; and wherein the act (A) includes an act of intercepting an access request from a first instance of the database management system application program.

27. The computer readable medium of claim 19, wherein the at least one application program lacks access privileges to read from the second storage volume.

28. The computer readable medium of claim 19, wherein the host computer includes an input/output (I/O) stack including a driver, and wherein instructions are coded to be responsive to a command received from a user to intercept and redirect access requests to the first storage volume so that the acts (A) and (B) are performed by the driver in response to the command received from the user.

29. The computer readable medium of claim 19, wherein the second storage volume is a hardware mirror of the first storage volume, and wherein the act (B) includes an act of redirecting said access request to the hardware mirror of the first storage volume.

30. The computer readable medium of claim 19, wherein the first and second storage volumes are stored on a same storage system.

31. The computer readable medium of claim 19, wherein the at least one storage system includes a first storage system that stores the first storage volume and a second storage system that stores the second storage volume.

32. The computer readable medium of claim 31, wherein the second storage volume is a hardware mirror of the first storage volume, and wherein the act (B) includes an act of redirecting said access request to the hardware mirror of the first storage volume.

33. An apparatus for use in a computer system including the apparatus and at least one storage system including a first storage volume and a second storage volume, the apparatus comprising:

a host computer comprising;

at least one processor to execute at least one application program; and at least one controller that intercepts an access request from the at least one application program to the first storage volume and redirects said access request to the second storage volume, so that the access request can be serviced by the second storage volume.

34. The apparatus of claim 33, wherein the host computer further comprises an input/output (I/O) stack, and wherein the at least one controller is disposed within the I/O stack.

35. The apparatus of claim 33, wherein the at least one controller comprises means for intercepting the access request from the at least one application program to the first storage volume and redirecting said access request to the second storage volume, so that the access request can be serviced by the second storage volume.

36. The apparatus of claim 33, wherein the second storage volume is a mirror of the first storage volume, and wherein the at least one controller redirects said access request to the mirror of the first storage volume.

37. The apparatus of claim 33, wherein the at least one controller intercepts and redirects the access request in a manner that is transparent to the at least one application program.

38. The apparatus of claim 33, wherein the at least one application program includes a database management system application program.

39. The apparatus of claim 33, wherein the access request is a read request.

40. The apparatus of claim 33, in combination with the computer system, wherein the host computer is a first host computer and the at least one application program is a first instance of the at least one application program, wherein the computer system further includes a second host computer executing a second instance of the at least one application program, and wherein the first and second instances of the at least one application program share access to the first volume.

41. The apparatus of claim 40, in combination with the computer system, wherein the at least one application program comprises a database management system application program.

42. The apparatus of claim 33, wherein the at least one application program lacks access privileges to read from the second storage volume.

43. The apparatus of claim 33, wherein the at least one controller is responsive to a command received from a user to intercept and redirect access requests to the first storage volume.

44. The apparatus of claim 33, wherein the host computer further comprises a driver disposed in the I/O stack, and wherein the at least one controller is implemented by the driver.

45. The apparatus of claim 33, wherein the second storage volume is a hardware mirror of the first storage volume, and wherein the at least one controller redirects said access request to the hardware mirror of the first storage volume.

46. The apparatus of claim 33, wherein the first and second storage volumes are included on a same storage system.

47. The apparatus of claim 33, wherein the at least one storage system includes a first storage system that stores the first storage volume and a second storage system that stores the second storage volume.

48. In a computer system including a host computer, a first storage system including a first storage volume, and a second storage system including a second storage volume, the host computer including at least one application program executing thereon, the first and second storage systems being coupled together, the second storage volume being an active hardware mirror of the first storage volume, a method comprising an act of:

(A) servicing a read request, from the at least one application program, to the second storage volume while maintaining the second storage volume as an active hardware mirror of the first storage volume;

wherein the act (A) is performed within the host computer.

49. The method of claim 48, wherein the act (A) is performed in a manner that is transparent to the at least one application program.

50. The method of claim 48, wherein the host computer includes an input/output (I/O) stack, and wherein the act (A) is performed in the I/O stack.

51. The method of claim 48, wherein the at least one application program includes a database management system application program.

52. In a computer system including a host computer, a first storage system including a first storage volume, and a second storage system including a second storage volume, the host computer including at least one application program executing thereon, the first and second storage systems being coupled together, the second storage volume being an active hardware mirror of the first storage volume, a method comprising an act of:

(A) in response to a failure preventing access from the host computer to the first storage volume, servicing access requests directed to the first storage volume from the second storage volume without reconfiguring the host computer;

wherein the act (A) is performed within the host computer.

53. The method of claim 52, wherein the act (A) is performed in a manner that is transparent to the at least one application program.

54. The method of claim 52, wherein the host computer includes an input/output (I/O) stack, and wherein the act (A) is performed in the I/O stack.

* * * * *